(12) United States Patent
Prakash et al.

(10) Patent No.: US 9,519,592 B2
(45) Date of Patent: Dec. 13, 2016

(54) STALE POINTER DETECTION WITH OVERLAPPING VERSIONED MEMORY

(71) Applicant: Oracle International Corporation, Redwood City, CA (US)

(72) Inventors: Raj Prakash, Saratoga, CA (US); Sheldon M. Lobo, Cary, NC (US)

(73) Assignee: Oracle International Corporation, Redwood Shores, CA (US)

( * ) Notice: Subject to any disclaimer, the term of this patent is extended or adjusted under 35 U.S.C. 154(b) by 435 days.

(21) Appl. No.: 13/691,467

(22) Filed: Nov. 30, 2012

(65) Prior Publication Data

US 2014/0156908 A1  Jun. 5, 2014

(51) Int. Cl.
*G06F 21/00* (2013.01)
*G06F 12/10* (2016.01)
*G06F 12/14* (2006.01)

(52) U.S. Cl.
CPC ........... *G06F 12/10* (2013.01); *G06F 12/1416* (2013.01); *G06F 2212/65* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 6,269,431 B1 * | 7/2001 | Dunham | 711/162 |
| 6,480,950 B1 * | 11/2002 | Lyubashevskiy et al. | 711/206 |
| 7,567,992 B1 * | 7/2009 | Edwardson et al. | |
| 2005/0162930 A1 * | 7/2005 | Mukaida | 365/185.33 |
| 2005/0273570 A1 * | 12/2005 | DeSouter et al. | 711/203 |
| 2006/0271725 A1 * | 11/2006 | Wong | 711/103 |
| 2009/0019256 A1 * | 1/2009 | Kneebone et al. | 711/209 |
| 2010/0250840 A1 * | 9/2010 | Wong | G06F 12/0246 711/103 |
| 2011/0082962 A1 * | 4/2011 | Horovitz et al. | 711/6 |
| 2011/0119533 A1 * | 5/2011 | Moyer et al. | 714/45 |
| 2012/0151118 A1 * | 6/2012 | Flynn et al. | 711/6 |
| 2012/0210095 A1 * | 8/2012 | Nellans et al. | 711/206 |
| 2013/0036332 A1 * | 2/2013 | Gove et al. | 714/54 |

* cited by examiner

*Primary Examiner* — Yaima Rigol
*Assistant Examiner* — Tasnima Matin
(74) *Attorney, Agent, or Firm* — Osha Liang LLP

(57) ABSTRACT

In general, in one aspect, the invention relates to a method for managing virtual memory (VM). The method includes receiving, from an application, a first access request comprising a first VM address identifying a VM location, obtaining a current VM location version value for the VM location, obtaining a first submitted VM location version value from the first VM address, and in response to a determination that the current VM location version value and the first submitted VM location version value match: servicing the first access request using the first VM address.

20 Claims, 6 Drawing Sheets

STALE POINTER DETECTION WITH OVERLAPPING VERSIONED MEMORY

BACKGROUND

Programs are assigned virtual memory that is mapped to real memory for use by the program. During the course of its use, a location in virtual memory may be allocated for different purposes and then freed for reuse. It is not an uncommon programming error for one process in a program to access a location in virtual memory that has already been freed and reallocated to a different process.

SUMMARY

In general, in one aspect, the invention relates to a method for managing virtual memory (VM). The method includes receiving, from an application, a first access request comprising a first VM address identifying a VM location, obtaining a current VM location version value for the VM location, obtaining a first submitted VM location version value from the first VM address, and in response to a determination that the current VM location version value and the first submitted VM location version value match: servicing the first access request using the first VM address.

In general, in one aspect, the invention relates to a non-transitory computer readable medium comprising instructions that, when executed by a processor, perform a method for managing VM. The method includes receiving, from an application, a first access request comprising a first VM address identifying a VM location, obtaining a current VM location version value for the VM location, obtaining a first submitted VM location version value from the first VM address, and in response to a determination that the current VM location version value and the first submitted VM location version value match: servicing the first access request using the first VM address.

In general, in one aspect, the invention relates to a system that includes a physical memory, a VM manager, and a central processing unit. The VM manager is configured to receive, from an application, an access request comprising a VM address corresponding to a VM location, obtain a current VM location version value for the VM location, and obtain a submitted VM location version value from the VM address. The central processing unit is configured to, in response to a determination that the current VM location version value and the submitted VM location version value match, service the access request using the VM address.

Other aspects of the invention will be apparent from the following description and the appended claims.

DETAILED DESCRIPTION

Figure 1:
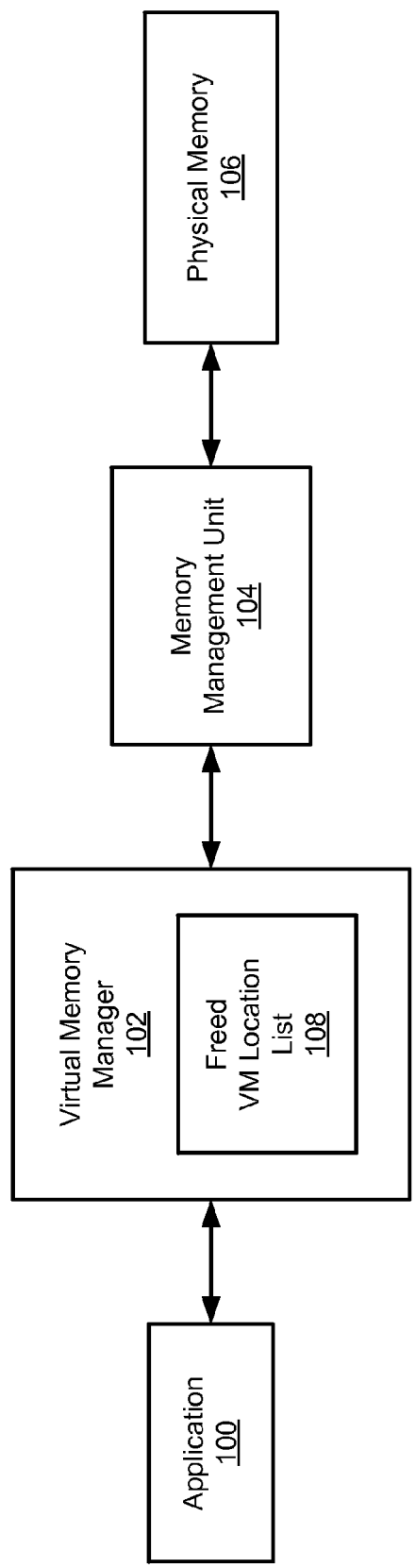
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for using multiple addresses to access a single location in virtual memory. Specifically, embodiments of the invention may be used to generate and interpret virtual memory addresses that include a version identifier.

FIG. 1 shows a diagram of a system in accordance with one or more embodiments of the invention. As shown in FIG. 1, the system includes an application (100), a virtual memory (VM) manager (102), a memory management unit (MMU) (104), and physical memory (106). The VM manager (102) includes a freed VM location list (108).

In one or more embodiments of the invention, the application (100) is computer software executing on a system (not shown). Specifically, the application (100) is a group of processes utilizing a processor (not shown) and physical memory (106) in order to accomplish a task.

In one or more embodiments of the invention, the VM manager (102) is a process or group of processes configured to manage the virtual memory. Specifically, the VM manager (102) is configured to facilitate the application's (100) use of the physical memory (106). In one embodiment of the invention, the VM manager (102) is configured to generate VM locations for use by the application (100). The VM manager (102) may also be configured to provide versioned VM addresses, corresponding to the VM locations, to the application (100). In one embodiment of the invention, the VM manager (102) is further configured to receive VM access requests from the application (100), and pass those access requests to the MMU (104). In one embodiment of the invention, the VM manager is part of an operating system kernel (not shown).

In one or more embodiments of the invention, the VM manager (102) tracks freed VM locations using the freed VM location list (108). In one embodiment of the invention, the VM manager (102) receives requests from the application (100) for available VM locations. In response, the VM manager (102) may consult the freed VM location list (108) to determine which VM locations may be allocated to the application (100). In one embodiment of the invention, the VM manager (102) is notified by the application (100) of VM locations no longer in use (i.e., freed VM locations).

In one embodiment of the invention, VM manager (102) tracks a VM location version associated with each allocated VM location. In one embodiment of the invention, the VM location version for a VM location is incremented each time the VM location is allocated. In one embodiment of the invention, VM locations are allocated as a group, and a single VM location version is used for the group of VM locations. In one embodiment of the invention, the VM manager (102) generates versioned VM addresses using the VM location version.

In one or more embodiments of the invention, the MMU (104) is a process or group of processes configured to provide access to the physical memory (106). Specifically, the MMU (104) may receive access requests from the application (100) (via the VM manager (102)). Such access requests may include a VM address, which is translated by the MMU (104) into a physical memory address.

In one or more embodiments of the invention, the MMU (104) is configured to interpret different VM addresses as referring to the same VM location (and subsequently, the same physical memory location). Specifically, the MMU (104) may receive access requests that include VM address that refer to different versions of the same VM location. In one embodiment of the invention, in translating a VM address, the MMU (104) disregards a portion of the submitted VM address that is associated with the version of the VM location. Specifically, the MMU (104) may translate multiple VM addresses for an application into the same physical memory address.

In one or more embodiments of the invention, the physical memory (106) is volatile memory used by the central processing unit (not shown) to execute software instructions (e.g., software used to generate application (100)). In one embodiment of the invention, the physical memory is divided into pages by the MMU (104) into which ranges of VM locations are loaded (or otherwise associated with).

Figure 2:
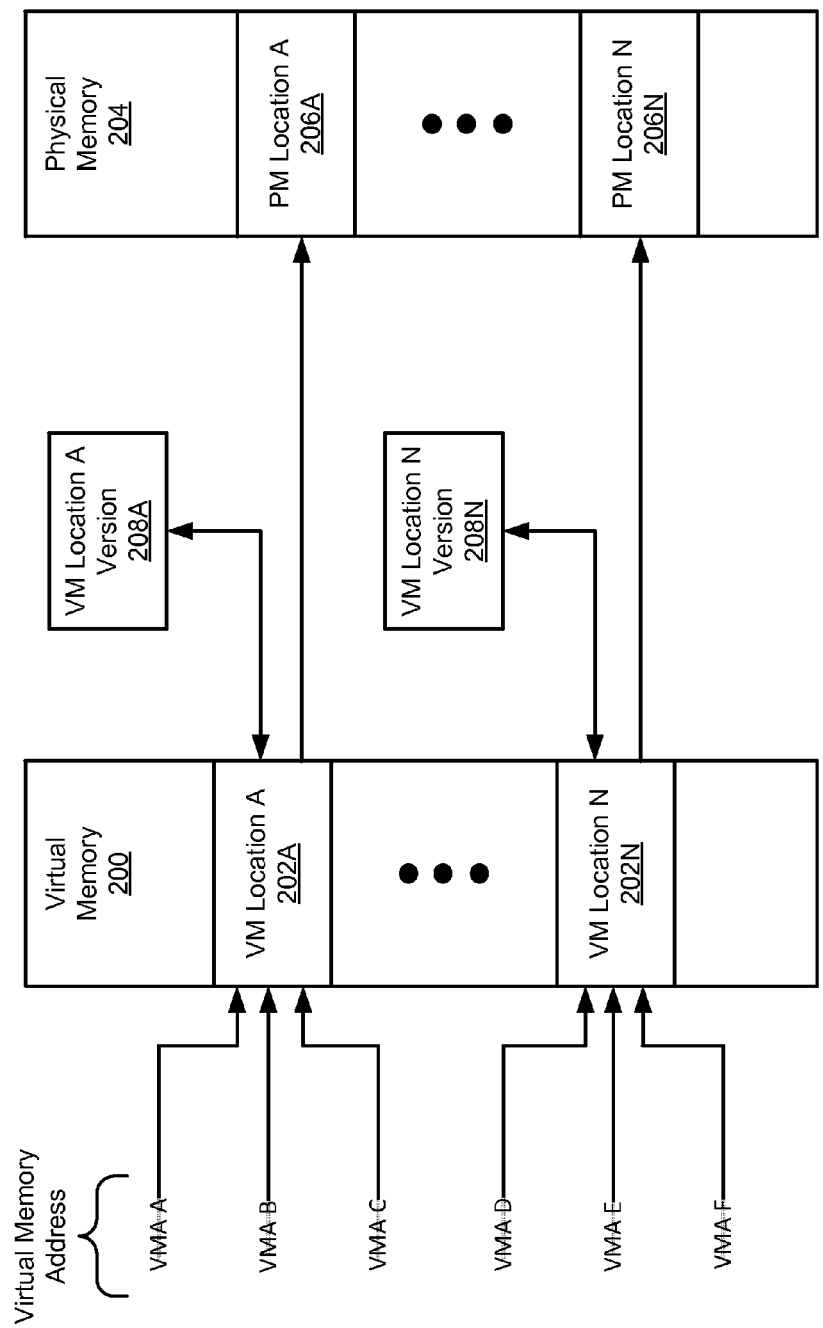
FIG. 2 shows a system in accordance with one or more embodiments of the invention.

FIG. 2 shows a diagram of a system in accordance with one or more embodiments of the invention. As shown in FIG. 2, virtual memory (200) includes a number of VM locations (VM location A (102A), VM location N (202N)). Each VM location (VM location A (202A), VM location N (202N)) is mapped to a physical memory (PM) location (PM location A (206A), PM location N (206N)) in physical memory (204). Each VM location (VM location A (202A), VM location N (202N)) is associated with a VM location version (VM location A version (208A), VM location N version (208N)).

In one or more embodiments of the invention, multiple virtual memory addresses (VMAs) (VMA A, VMA B, VMA C, VMA D, VMA E, VMA F) may point to (or otherwise reference) the same VM location (VM location A (202A), VM location N (202N)). As shown in FIG. 2, VMA A, VMA B, and VMA C point to VM location A (202A) and VMA D, VMA E, and VMA F point to VM location N (202N).

In one or more embodiments of the invention, the VM location version (VM location A version (208A), VM location N version (208N)) includes a value used to differentiate one allocation of the VM location (VM location A (202A), VM location N (202N)) from another. For example, while VMA A, VMA B, and VMA C each point to the same VM location (VM location A (202A)), VMA A, VMA B, and VMA C may each refer to a different version of VM location A (202A). In one embodiment of the invention, a portion of the VM address (VMA A, VMA B, VMA C, VMA D, VMA E, VMA F) may be used to derive the VM location version (VM location A version (208A), VM location N version (208N)) associated with the VMA (VMA A, VMA B, VMA C, VMA D, VMA E, VMA F).

In one or more embodiments of the invention, each VM address (VMA A, VMA B, VMA C, VMA D, VMA E, VMA F) is directly translated into a physical memory address without removing the portion of the VM address that may be used to derive the VM location version (VM location A version (208A), VM location N version (208N)). Specifically, the MMU may be configured to disregard the portion of the VM address that refers to the VM location version. For example, an application instruction may include the VM address "10002000," which refers to version "1000" of a VM location. That instruction may be directly translated by the MMU into a physical memory address. Said another way, the VM address "10002000" is not converted into the address "2000" (i.e., the version "1000" is not stripped out of the address) before the MMU and central processing unit are able to parse the instruction.

Figure 3:
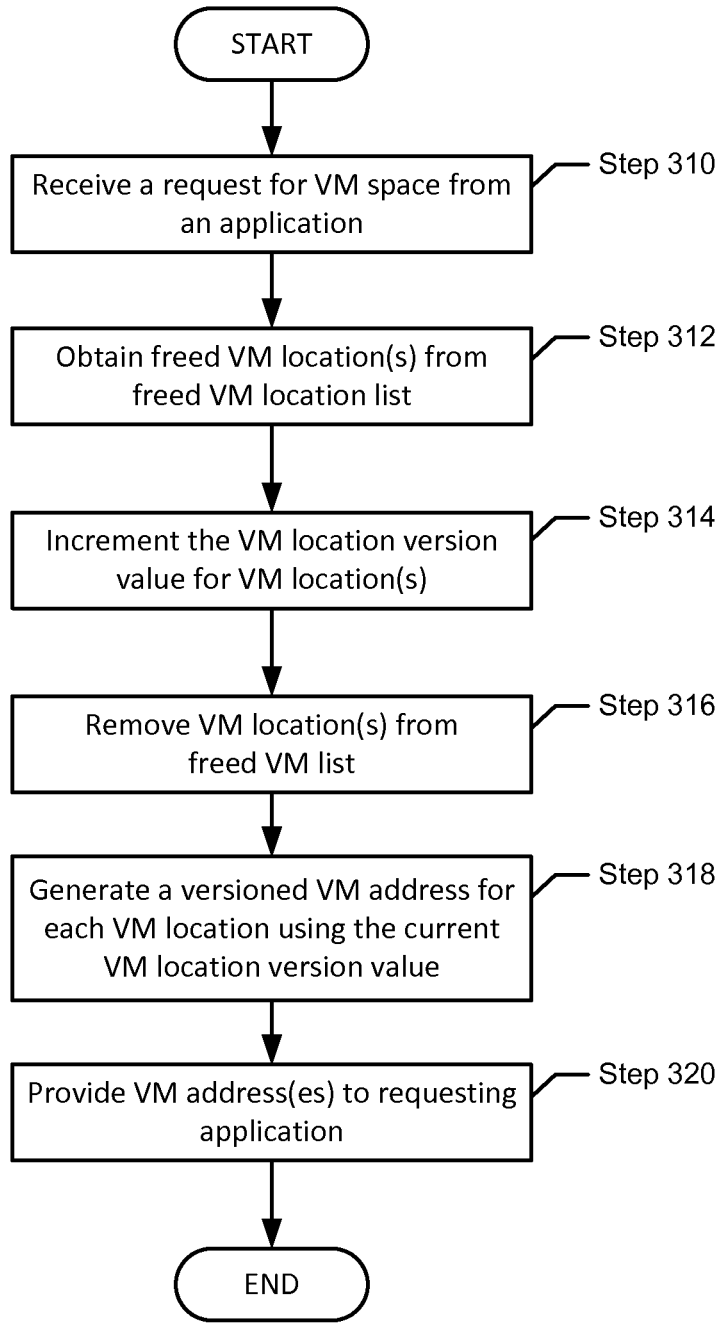
FIG. 3 shows a flow diagram in accordance with one or more embodiments of the invention.

FIG. 3 shows a flowchart for allocating virtual memory in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 310, the VM manager receives a request for VM space from an application. In Step 312, the VM manager accesses a freed VM location list to determine a VM location or set of VM locations available to be allocated to the application. In Step 314, the VM manager increments the VM location version associated with the VM location to be allocated. In Step 316, the VM location(s) to be allocated to the application are removed from the freed VM location list.

In one embodiment of the invention, the when an application notifies the VM manager that a versioned VM address is no longer in use (i.e., freed), the VM manager increments the VM location version value associated with the VM location being freed. A new versioned VM address is then generated by the VM manager before the VM address is added to the freed VM location list. In one embodiment of the invention, this incrementing the version of VM locations before adding them to the freed VM location list allows the VM manager to control access (and potentially log an error) if an application attempts to access a VM location that has previously been freed, but has not yet been reallocated.

In Step 318, the VM manager generates a versioned VM address for each VM location using the current VM location version value. In one embodiment of the invention, the versioned VM address is generated by combining the VM location version value with a portion of the VM address as stored in the freed VM location list. For example, if the VM address as stored in the freed VM location list is "30002000," and the current VM location version value is "3001," then the VM manager may generate the versioned VM address as "30011000." Note that in this example, both "30002000" and "30012000" refer to the same VM location, but different VM location versions. In Step 320, the VM address(es) for the allocated VM location(s) are provided to the requesting application.

Figure 4:
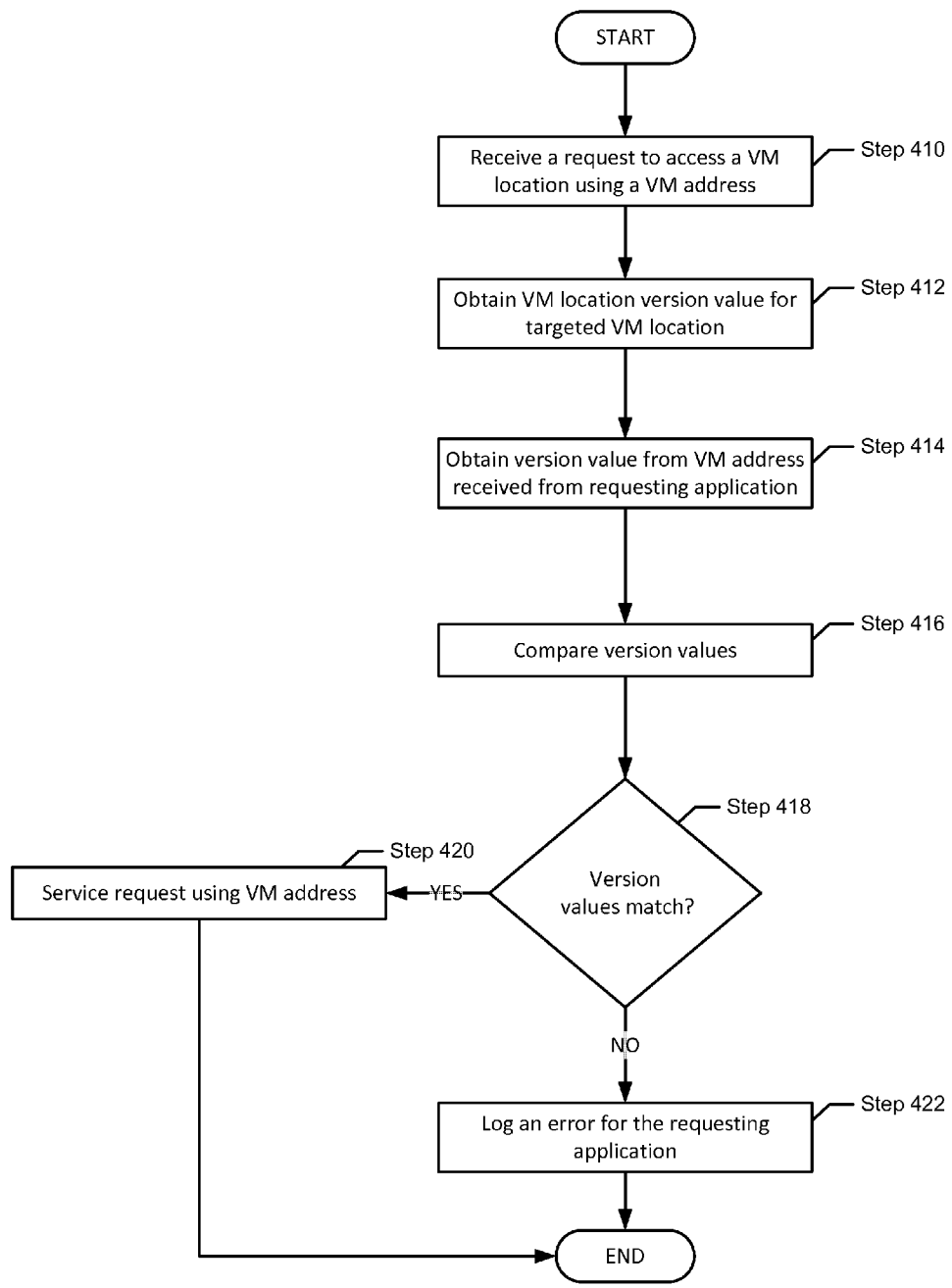
FIG. 4 shows a flow diagram in accordance with one or more embodiments of the invention.

FIG. 4 shows a flowchart for accessing a VM location in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 410, the VM manager receives a request to access a VM location using a VM address. In Step 412, the VM manager obtains a VM location version value for the VM location associated with the VM address. In Step 414, the VM manager obtains the version value from the VM address submitted in the request. In Step 416, the version values are compared. In Step 418, a determination is made, based on the comparison, as to whether the version values match.

If, in Step 418, the version values match, then in Step 420, the VM address is passed to the MMU, and the application gains access to the VM location. If, in Step 422, the version values do not match, then in Step 422, the VM manager logs an error for the application. In one embodiment of the invention, logging an error includes, but is not limited to, causing a segmentation fault (segfault) error. In one embodiment of the invention, the error sent to the requesting application informs the application that it has attempted to access a VM location using an outdated VM address version.

Figure 5:
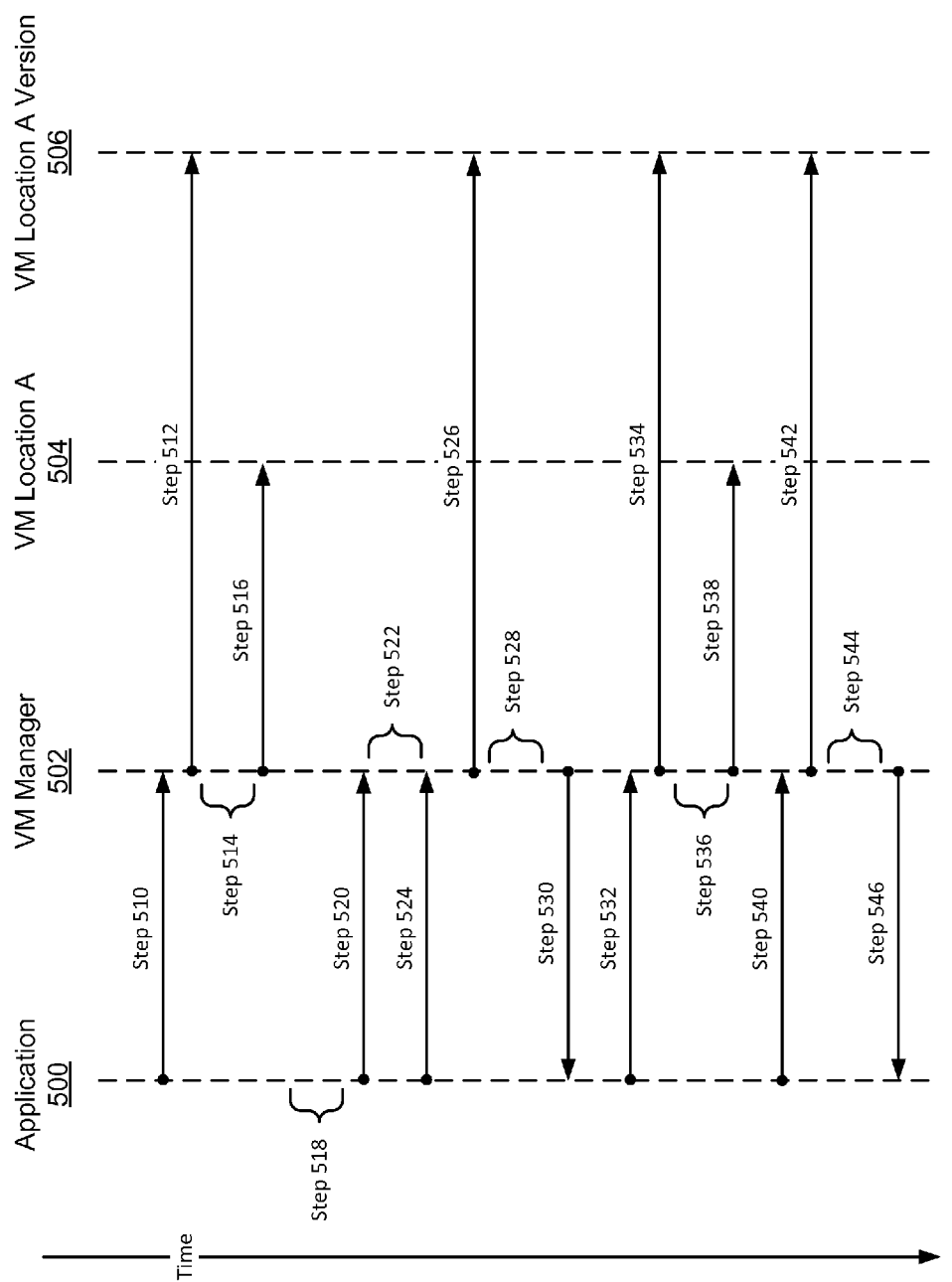
FIG. 5 shows an example in accordance with one or more embodiments of the invention.

FIG. 5 shows an example timeline in accordance with one or more embodiments of the invention. In Step 510, the application (500) sends a request to store the word "California" in location "10002000." In Step 512, the VM manager (502) obtains the current VM location version value for the location "10002000," which for the purposes of the example is "1000." In one embodiment of the invention, the VM location version value is stored in a VM location version file maintained by the VM manager. In Step 514, the VM manager (502) obtains the VM version value from the VM address submitted by the application (500), which for the purposes of the example, is "1000." Also in Step 514, the VM manager (502) compares the two values and determines that they match. In Step 516, the VM manager (502) services the request and stores, via the MMU, the word "California" in memory using the VM address "10002000."

In Step 518, the VM address "10002000" is stored by the application (500) in a separate process involving physical memory. In Step 520, the application (500) determines that the VM location referred to by the VM address "10002000" is no longer needed, and the application (500) notifies the VM manager (502) that the VM location should be freed. However, due to a programming error, the VM address "10002000" remains stored (either in persistent memory or another VM location) as referring to a U.S. state for which the value is "California." In Step 522, the VM address "10002000" is added to the freed VM location list.

In Step 524, the application (500) requests to be allocated a VM location. In Step 526, the VM manager (502) obtains the VM address "10002000" from the freed VM location list, and increments the VM location version value stored in the VM location version (506) to "1001." In Step 528, the VM manager (502) generates a new VM address using the new VM location version value "1001" and the VM address from the freed VM location list. For the purposes of this example, the generated VM address is "10012000." In Step 530, the VM manager (502) provides the VM address "10012000" to the application (500).

In Step 532, the application (500) sends a request to store the word "Texas" in location "10012000." In Step 534, the VM manager (502) obtains the current VM location version value for the location "10012000," which for the purposes of the example is "1001." In Step 536, the VM manager (502) obtains the VM version value from the VM address submitted by the application (500), which for the purposes of the example, is "1001." Also in Step 536, the VM manager (502) compares the two values and determines that they match. In Step 538, the VM manager (502) services the request and stores, via the MMU, the word "Texas" in memory using the VM address "10012000."

In Step 540, the application (500) sends a request to access the VM location corresponding to VM address "10002000," expecting the value to be "California." In Step 542, the VM manager (502) obtains the current VM location version value for the location "10002000," which for the purposes of the example is "1001." In Step 544, the VM manager (502) obtains the VM version value from the VM address submitted by the application (500), which for the purposes of the example, is "1000." Also in Step 544, the VM manager (502) compares the two values and determines that they do not match. At Step 546, the VM manager (502) sends a segfault error to application (500).

In the current example, if the version of the address "10002000" submitted by the application (500) had not been present, the VM manager (502) would have provided the data ("Texas") to the application (500). However, the portion of the application (500) requesting the data would have expected the value to be "California." By allowing access via the outdated VM address, the application (500) would have generated unexpected results, either immediately or at some point in the future.

Figure 6:
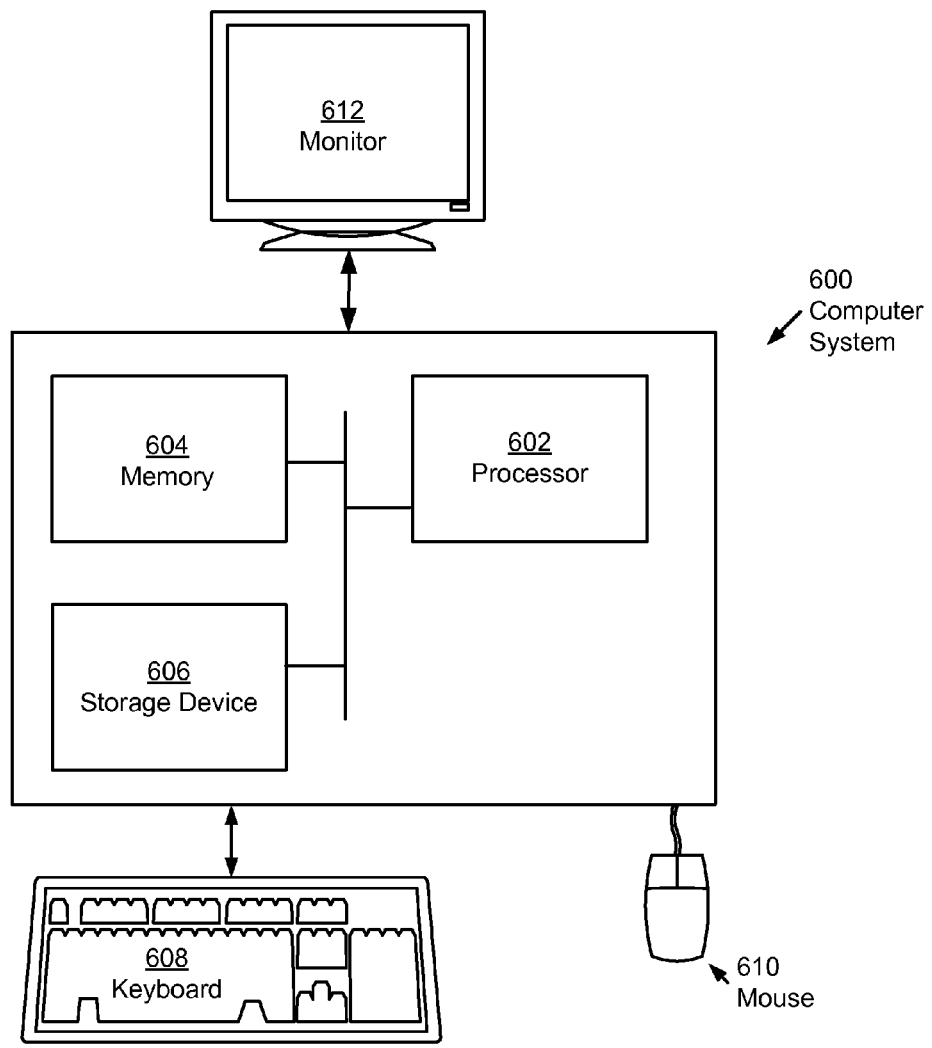
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602) such as a central processing unit (CPU) or other hardware processor(s), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (602) is hardware. For example, the processor may be an integrated circuit. The computer system (600) may also include input means, such as a keyboard (608), a mouse (610), or a microphone (not shown). Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for managing virtual memory (VM) comprising:
  incrementing, in response to updating a status of a VM location in a freed VM location list, a version of the VM location to generate a first VM location version value for the VM location;

generating a first versioned VM address based on the first VM location version value;

receiving, from an application, a first access request comprising the first versioned VM address identifying the VM location;

obtaining, in response to the first access request, the first VM location version value from the first versioned VM address;

comparing, in response to the first access request, a first current VM location version value and the first VM location version value to determine a match, wherein the first current VM location version value corresponds to the version of the VM location concurrent with the first access request; and servicing, in response to the match, the first access request using the first versioned VM address.

2. The method of claim 1, further comprising:

receiving, from the application, a second access request comprising a second versioned VM address identifying the VM location;

obtaining, in response to the second access request, a second VM location version value from the second versioned VM address;

comparing, in response to the second access request, a second current VM location version value and the second VM location version value to determine a mismatch, wherein the second current VM location version value corresponds to the version of the VM location concurrent with the second access request; and sending, in response to the mismatch, an error to the application.

3. The method of claim 2, further comprising:

receiving a notification that the VM location is no longer in use, wherein the notification comprises the second versioned VM address to identify the VM location, wherein updating the status of the VM location in the freed VM location list comprises adding the VM location to the freed VM location list, and wherein the second access request is received subsequent to the notification.

4. The method of claim 1, further comprising:

receiving, from the application, an allocation request; and returning, to the application in response to the allocation request, the first versioned VM address identifying the VM location, wherein updating the status of the VM location in the freed VM location list comprises removing the VM location from the freed VM location list.

5. The method of claim 1, wherein updating the status of the VM location in the freed VM location list comprises at least one selected from a group consisting of adding the VM location to the freed VM location list and removing the VM location from the freed VM location list.

6. The method of claim 1, wherein servicing the first access request comprises:

translating the first versioned VM address to obtain a physical memory address, wherein the physical memory address is mapped to the VM location.

7. The method of claim 6, wherein the first versioned VM address comprises the first VM location version value, and wherein translating the first versioned VM address to obtain the physical memory address comprises disregarding the first VM location version value.

8. The method of claim 7, wherein the first versioned VM address is translated directly without removing the first VM location version value.

9. The method of claim 1, wherein servicing the first access request using the first versioned VM address comprises one selected from a group consisting of writing data at the VM location identified by the first versioned VM address and reading data from the VM location identified by the first versioned VM address.

10. A non-transitory computer readable medium comprising instructions that, when executed by a processor, perform a method for managing virtual memory (VM), the method comprising:

incrementing, in response to updating a status of a VM location in a freed VM location list, a version of the VM location to generate a first VM location version value for the VM location;

generating a first versioned VM address based on the first VM location version value;

receiving, from an application, a first access request comprising the first versioned VM address identifying the VM location;

obtaining, in response to the first access request, the first VM location version value from the first versioned VM address;

comparing, in response to the first access request, a first current VM location version value and the first VM location version value to determine a match, wherein the first current VM location version value corresponds to the version of the VM location concurrent with the first access request; and servicing, in response to the match, the first access request using the first versioned VM address.

11. The non-transitory computer readable medium of claim 10, the method further comprising:

receiving, from the application, a second access request comprising a second versioned VM address identifying the VM location;

obtaining, in response to the second access request, a second VM location version value from the second versioned VM address;

comparing, in response to the second access request, a second current VM location version value and the second VM location version value to determine a mismatch, wherein the second current VM location version value corresponds to the version of the VM location concurrent with the second access request; and sending, in response to the mismatch, an error to the application.

12. The non-transitory computer readable medium of claim 11, the method further comprising:

receiving a notification that the VM location is no longer in use, wherein the notification comprises the second versioned VM address to identify the VM location, wherein updating the status of the VM location in the freed VM location list comprises adding the VM location to the freed VM location list, and wherein the second access request is received subsequent to the notification.

13. The non-transitory computer readable medium of claim 10, the method further comprising:

receiving, from the application, an allocation request; and returning, to the application in response to the allocation request, the first versioned VM address identifying the VM location, wherein updating the status of the VM location in the freed VM location list comprises removing the VM location from the freed VM location list.

14. The non-transitory computer readable medium of claim 10, wherein updating the status of the VM location in the freed VM location list comprises at least one selected from a group consisting of adding the VM location to the freed VM location list and removing the VM location from the freed VM location list.

15. The non-transitory computer readable medium of claim 10, wherein servicing the first access request using the first versioned VM address comprises:

translating the first versioned VM address to obtain a physical memory address, wherein the physical memory address is mapped to the VM location.

16. The non-transitory computer readable medium of claim 15, wherein the first versioned VM address comprises the first VM location version value, and wherein translating the first versioned VM address to obtain the physical memory address comprises disregarding the first VM location version value.

17. The non-transitory computer readable medium of claim 16, wherein the first versioned VM address is translated directly without removing the first VM location version value.

18. The non-transitory computer readable medium of claim 10, wherein servicing the first access request using the first versioned VM address comprises one selected from a group consisting of writing data at the VM location identified by the first versioned VM address and reading data from the VM location identified by the first versioned VM address.

19. A system comprising:

physical memory;

a virtual memory (VM) manager configured to:
- increment, in response to updating a status of a VM location in a freed VM location list, a version of the VM location to generate a VM location version value for the VM location;
- generate a versioned VM address based on the VM location version value;
- receive, from an application, an access request comprising the versioned VM address corresponding to the VM location;
- obtain, in response to the access request, the VM location version value from the versioned VM address; and
- compare, in response to the access request, a current VM location version value and the VM location version value to determine a match, wherein the current VM location version value corresponds to the version of the VM location concurrent with the first access request; and a central processing unit configured to:
- in response to the match, service the access request using the versioned VM address.

20. The system of claim 19, further comprising:

a memory management unit (MMU) configured to:
- translate the versioned VM address to obtain a physical memory address corresponding to a location in the physical memory, wherein the physical memory address is mapped to the VM location.

* * * * *